(12) United States Patent
Jia et al.

(10) Patent No.: US 7,180,691 B2
(45) Date of Patent: Feb. 20, 2007

(54) COLOR WHEEL ASSEMBLY

(75) Inventors: Yan-Jun Jia, Dong-Guan (CN); Shou-Chy Jia, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/349,494

(22) Filed: Feb. 6, 2006

(65) Prior Publication Data

US 2006/0237357 A1 Oct. 26, 2006

(30) Foreign Application Priority Data

Apr. 22, 2005 (TW) .................................. 094112861

(51) Int. Cl.
*G02B 5/22* (2006.01)
*G02B 7/00* (2006.01)
(52) U.S. Cl. ...................... 359/892; 359/891; 359/885; 348/743; 356/418; 353/84
(58) Field of Classification Search ................ 359/891, 359/892, 885; 348/743; 356/418; 353/84; 362/293

See application file for complete search history.

(56) References Cited

U.S. PATENT DOCUMENTS

| 5,868,482 | A | 2/1999 | Edlinger et al. | |
| 6,715,887 | B2 * | 4/2004 | Chang | 353/84 |
| 6,999,252 | B2 * | 2/2006 | Lee et al. | 359/892 |
| 2005/0168709 | A1 * | 8/2005 | Wu | 353/84 |
| 2006/0044656 | A1 * | 3/2006 | Niwa et al. | 359/892 |

* cited by examiner

*Primary Examiner*—Leonidas Boutsikaris
(74) *Attorney, Agent, or Firm*—Darby & Darby

(57) ABSTRACT

A color wheel assembly includes a carrier, a color filter assembly mounted coaxially on the carrier and formed by a plurality of annularly arranged filter segments, and a connecting unit including a plurality of annularly arranged limiting pieces connected respectively to the filter segments, and a limiting groove for receiving the limiting pieces. Each limiting piece has opposite first and second radial end faces, an inner face interconnecting the radial end faces, an outer face interconnecting the radial end faces and extending outwardly of the inner face, and a passage extending between the inner and outer faces and extending through the radial end faces. A press cover is connected to the carrier to press the filter segments against the carrier.

14 Claims, 7 Drawing Sheets

COLOR WHEEL ASSEMBLY

CROSS-REFERENCE TO RELATED APPLICATION

This application claims priority of Taiwanese Application No. 094112861, filed on Apr. 22, 2005.

BACKGROUND OF THE INVENTION

1. Field of the Invention

The invention relates to a color wheel assembly, more particularly to a color wheel assembly that can prevent undesirable overflow of adhesive during assembly and that can permit easy adjustment of rotational imbalance.

2. Description of the Related Art

Referring to FIG. 1, a conventional color wheel assembly, as disclosed in U.S. Pat. No. 5,868,482, is shown to include a motor 1, a carrier 2 mounted on a shaft of the motor 1, an adhesive layer 3 coated on the carrier 2, three sector-shaped filter segments 4 that are adhered to the adhesive layer 3 and that are combined to form a ring shape, and a ring member 5 that covers a bonding area of the filter segments 4 on the carrier 2. When the motor 1 drives the carrier 2 and the filter segments 4 to rotate at a high speed, light beams projected from a light source (not shown) can pass through the filter segments 4 so as to produce an image on a screen (not shown).

Although the conventional color wheel assembly can achieve its intended purpose, it has the following drawbacks:

1. To compensate for imbalance, the conventional color wheel assembly is provided with a balancing hole 201 in the carrier 2. However, boring of the balancing hole 201 is difficult since a proper force has to be exerted so that damage to the bearing of the motor 1 that supports the carrier 2 does not occur. Further, metal shavings produced during boring of the balancing hole 201 have a tendency to disperse and thereby cause damage to coated surfaces of the filter segments 4.

2. Since the filter segments 4 are adhered together to the carrier 2 during assembly, when one of the filter segments 4 is damaged or defective, the whole conventional color wheel assembly has to be discarded since the conventional color wheel assembly does not permit partial replacement of component parts. As a result, not only are the components wasted, but overall production costs are indirectly increased.

Referring to FIGS. 2 and 3, another conventional color wheel assembly, as disclosed in U.S. Pat. No. 6,715,887, is shown to include a motor 6, a carrier 7 mounted on a shaft of the motor 6 and having an annular groove 701, a plurality of sector-shaped filter segments 8, and a packing ring 9 fitted into the annular groove 701. During assembly, the packing ring 9 is first adhered to the filter segments 8 so as to form one body, after which balancing is performed. Finally, the packing ring 9 is fitted into the annular groove 701.

Although any imbalance in the conventional color wheel assembly can be minimized, the conventional color wheel assembly has the following drawbacks:

1. When a top surface of the packing ring 9 is adhered to bottom surfaces of the filter segments 8, excess adhesive is likely to back up onto the bottom surfaces of the filter segments 8. This results in interference with light beams projected from a light source (not shown).

2. This conventional color wheel assembly also does not permit partial replacement of component parts since the filter segments 8 are adhered fixedly to the packing ring 9.

Hence, when one of the filter segments 8 is damaged or defective, the whole assembly of the filter segments 8 and the packing ring 9 has to be replaced.

3. Imbalance may still occur due to the motor 6 after assembly. However, correction of imbalance after assembly is difficult.

SUMMARY OF THE INVENTION

Therefore, the object of the present invention is to provide a color wheel assembly that is capable of overcoming the aforementioned drawbacks of the prior art.

According to one aspect of this invention, a color wheel assembly comprises a carrier rotatable about an axis, a color filter assembly, a connecting unit, and a press cover. The color filter assembly is mounted coaxially on the carrier, and is formed by a plurality of annularly arranged filter segments. The press cover is connected to the carrier to press the filter segments against the carrier. The connecting unit includes a plurality of annularly arranged limiting pieces connected respectively to the filter segments, and a limiting groove provided in one of the carrier and the press cover for receiving the limiting pieces. Each of the limiting pieces has opposite first and second radial end faces, an inner face interconnecting the first and second radial end faces, an outer face interconnecting the first and second radial end faces and extending outwardly of the inner face, and a passage extending between the inner and outer faces and extending through the first and second radial end faces.

According to another aspect of this invention, a color wheel assembly comprises a carrier, a plurality of annularly arranged filter segments, a plurality of annularly arranged limiting pieces, and a press cover. The carrier is rotatable about an axis, and is formed with an annular groove surrounding the axis. The filter segments are mounted coaxially on the carrier, and have inner peripheral faces proximate to the axis, and outer peripheral faces distal from the axis. The limiting pieces are connected respectively to the filter segments proximate to the inner peripheral faces. Each of the limiting pieces has a top face connected to the respective one of the filter segments, and a passage formed in the top face. A press cover is connected to the carrier to press the filter segments against the carrier.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
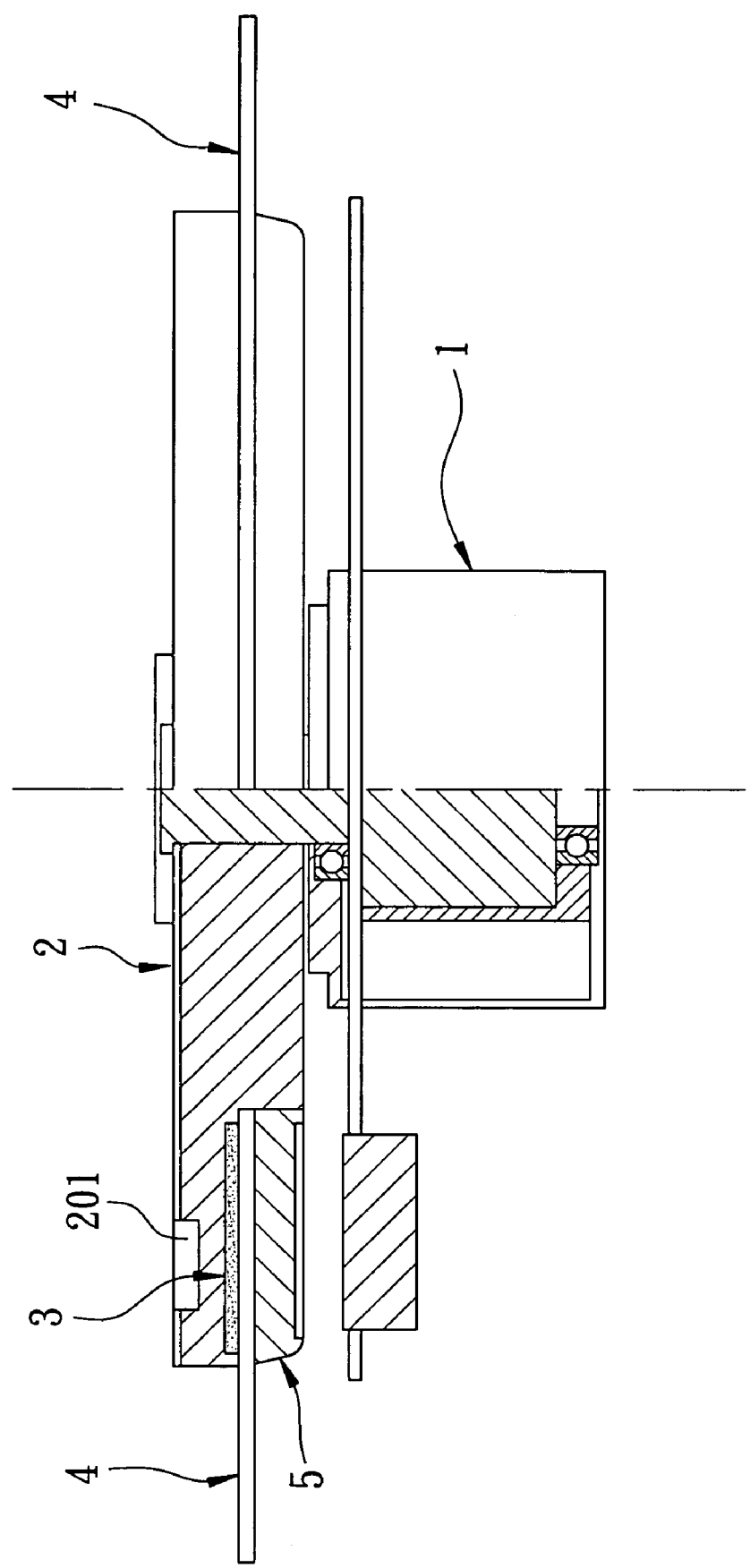
FIG. 1 is a partly sectional view of a conventional color wheel assembly disclosed in U.S. Pat. No. 5,868,482.
Figure 2:
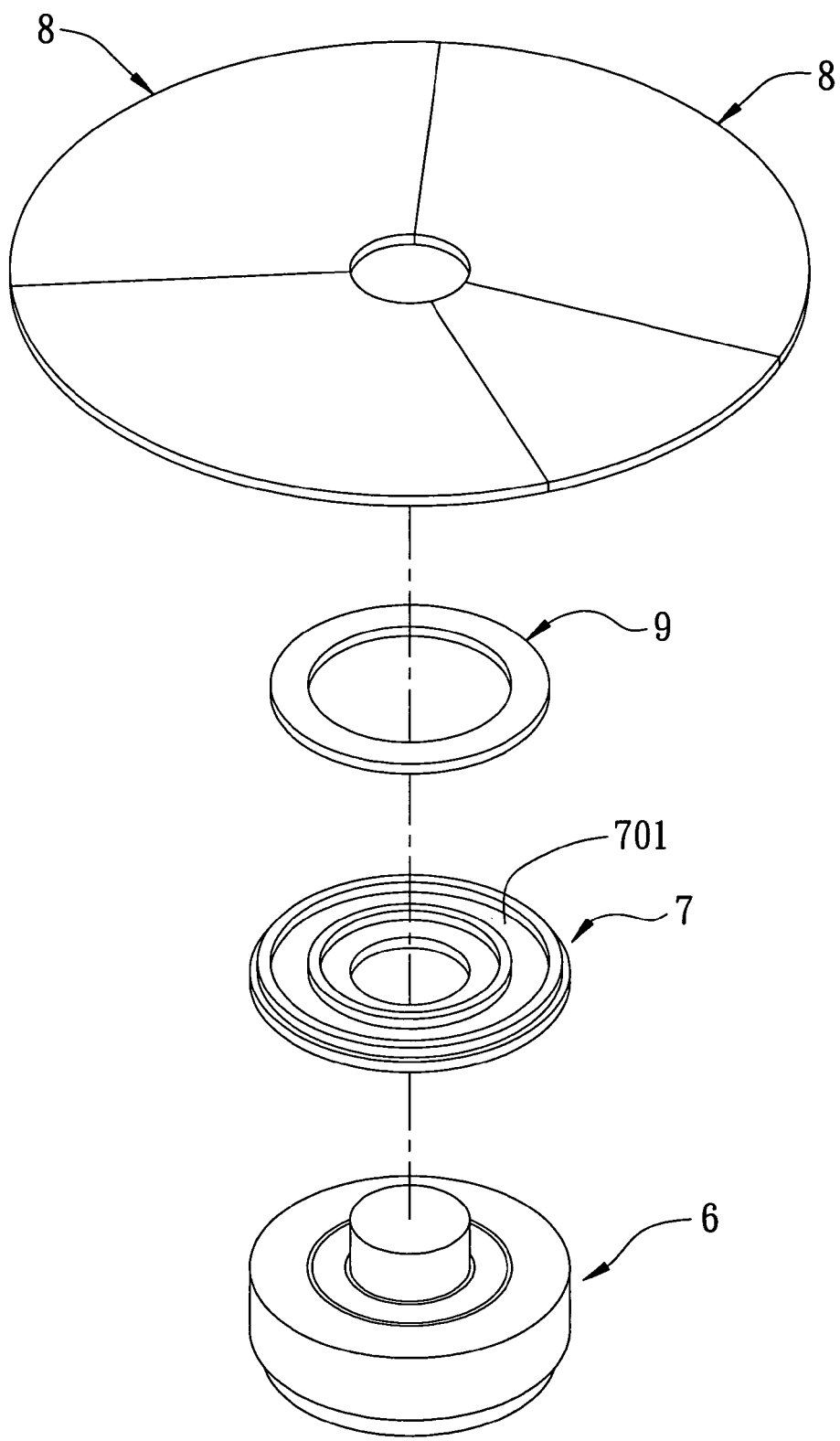
FIG. 2 is an exploded perspective view of a conventional color wheel assembly disclosed in U.S. Pat. No. 6,715,887.
Figure 3:
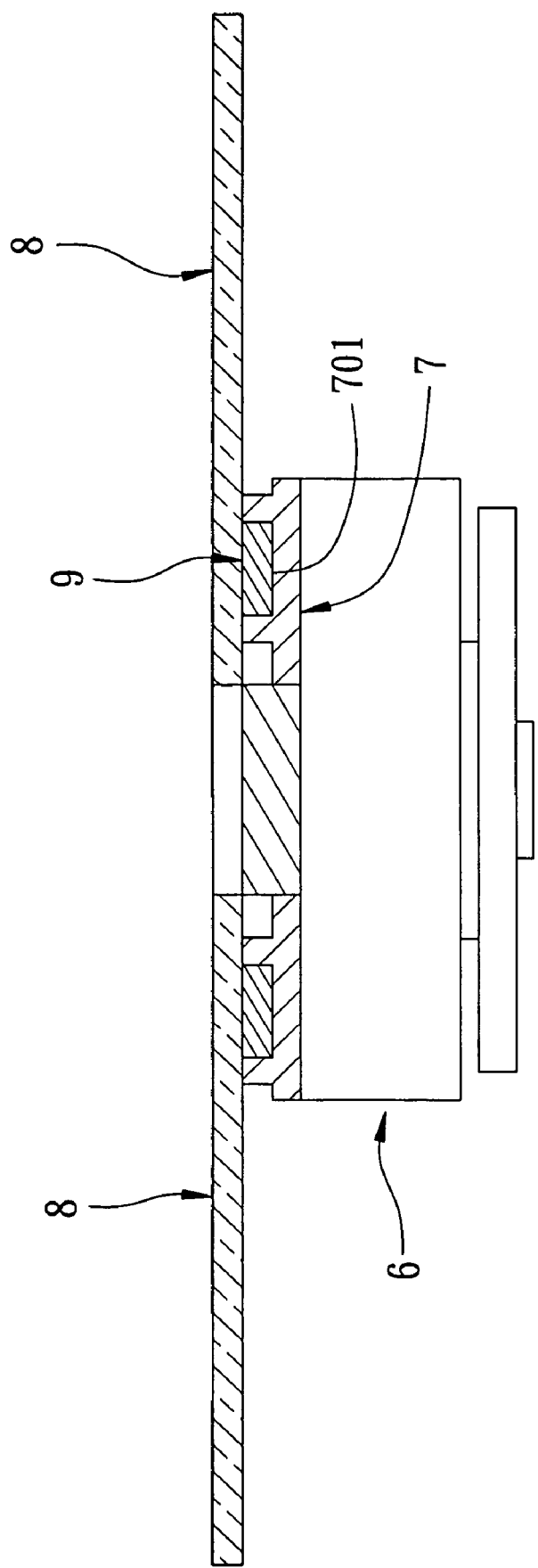
FIG. 3 is a partly sectional view of the conventional color wheel assembly of FIG. 2.
Figure 4:
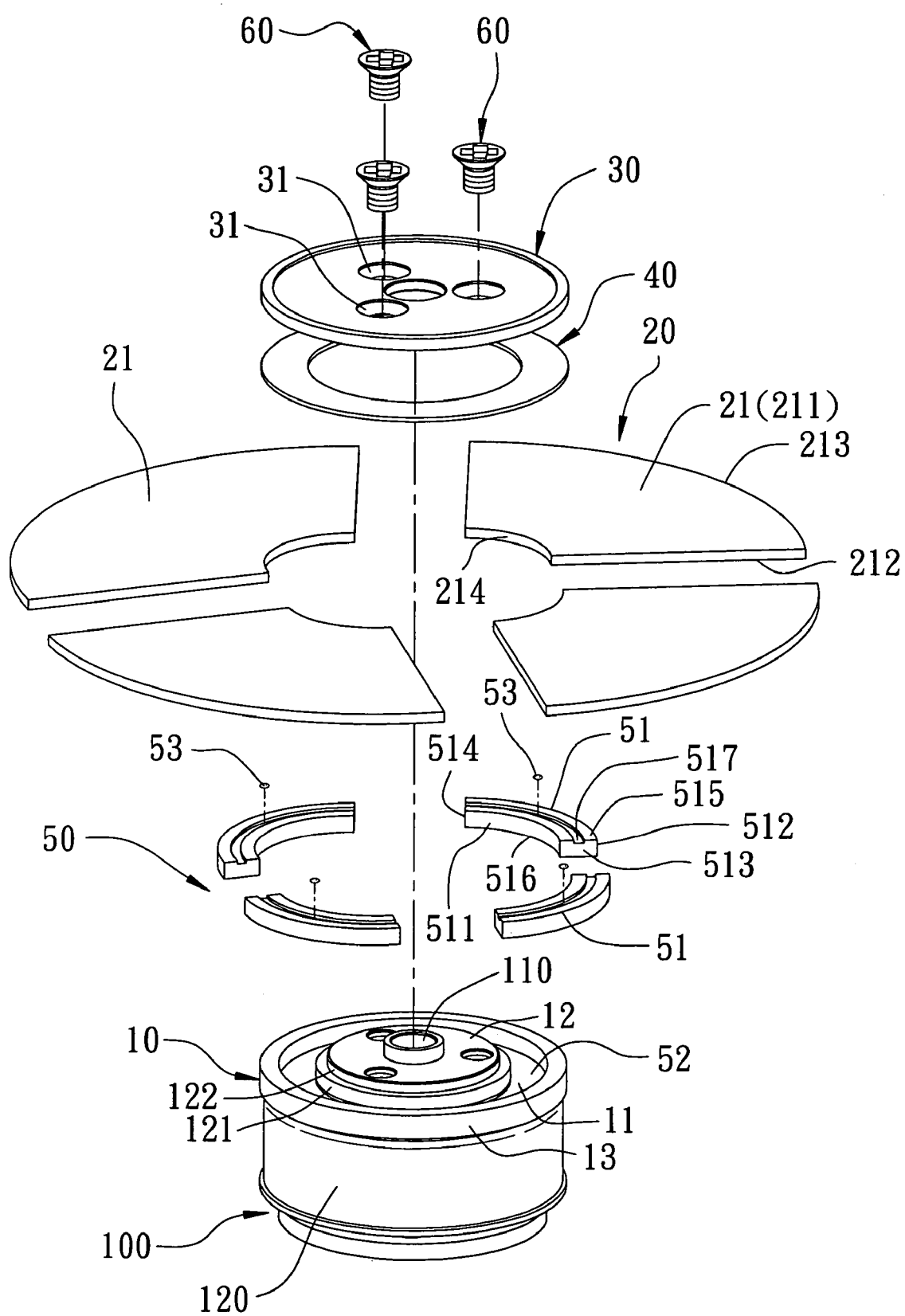
FIG. 4 is an exploded perspective view of the preferred embodiment of a color wheel assembly according to the present invention.
Figure 5:
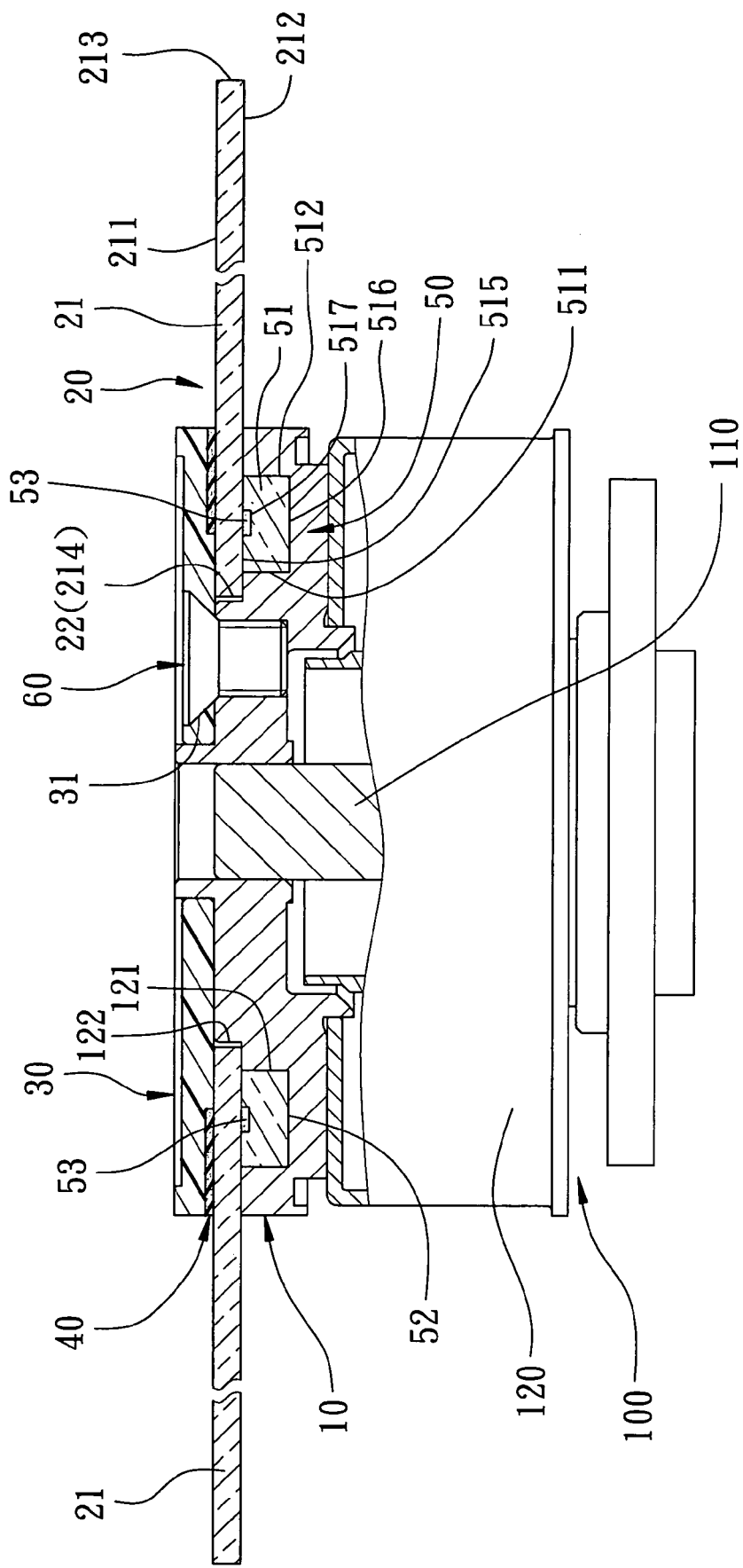
FIG. 5 is a partly sectional view of the preferred embodiment in an assembled state.

Referring to FIGS. 4 to 7, the preferred embodiment of a color wheel assembly according to the present invention is adapted to be mounted on a motor 100, which includes a rotary shaft 110 and a rotary hub 120. The color wheel assembly of the present invention comprises a carrier 10, a color filter assembly 20, a press cover 30, a packing ring 40, a connecting unit 50, a plurality of fasteners 60, and a counterweight element 70.

The carrier 10 is mounted on the rotary shaft 110 and the rotary hub 120 of the motor 100, and is driven by the motor 100 to rotate about an axis. The carrier 10 has a top face 11, a central boss 12 extending axially and upwardly from the top face 11, and a peripheral wall 13 projecting axially and upwardly from an outer periphery of the top face 11. The central boss 12 includes a large diameter portion 121, and a small diameter portion 122 on top of the large diameter portion 121.

The color filter assembly 20 is mounted coaxially on the carrier 10, and is formed by a plurality of annularly arranged filter segments 21. Each of the filter segments 21 has an inner peripheral face 214, an outer peripheral face 213 extending around the inner peripheral face 214, and a top face 211 and a bottom face 212 extending between the inner and outer peripheral faces 214, 213. The inner peripheral faces 214 of the filter segments 21 cooperatively define a central hole 22 in the color filter assembly 20.

The press cover 30 is formed as a circular plate, and is formed with three angularly spaced-apart through holes 31 for extension of the fasteners or bolts 60 therethrough, respectively. The press cover 30 is connected to the carrier 10 so as to press the filter segments 21 against the carrier 10.

The packing ring 40 is pressed between a bottom face of the press cover 30 and the top faces 211 of the filter segments 21.

The connecting unit 50 includes a plurality of annularly arranged limiting pieces 51, a limiting groove 52, and a plurality of adhering elements 53. The limiting pieces 51 are connected respectively to the filter segments 21. Each limiting piece 51 has opposite first and second radial end faces 513, 514, an inner face 511 interconnecting the first and second radial end faces 513, 514, an outer face 512 interconnecting the first and second radial end faces 513, 514 and extending outwardly of the inner face 511, a top face 515 and a bottom face 516 extending between the inner and outer faces 511, 512 and between the first and second radial end faces 513, 514, and a passage 517 that is formed in the top face 515, that extends between the inner and outer faces 511, 512, and that extends through the first and second radial end faces 513, 514. When the adhering elements 53 are disposed respectively in the passages 517 of the limiting pieces 51, the top faces 515 of the limiting pieces 51 are adhered respectively to the bottom faces 212 of the filter segments 21 proximate to the central hole 22, so that the limiting pieces 51 and the filter segments 21 are formed as one piece.

The limiting groove 52 is annular, and is formed in the top face 11 of the carrier 10. The large diameter portion 121 of the central boss 12 cooperates with the peripheral wall 13 of the carrier 10 to define therebetween the limiting groove 52.

In this embodiment, the fasteners are in the form of bolts 60, and are used for fastening the press cover 30 to the carrier 10.

To assemble the color wheel assembly, the limiting pieces 51 are first disposed in the limiting groove 52 so that the filter segments 21 are supported on the carrier 10. The press cover 30 and the packing ring 40 are subsequently mounted on the color filter assembly 20, after which the bolts 60 are passed respectively through the through holes 31 in the press cover 30, the packing ring 40, and the central hole 22 in the color filter assembly 20, and engaged threadedly and respectively to screw holes in the central boss 12 of the carrier 10. As such, the press cover 30, the packing ring 40, and the color filter assembly 20 are pressed tightly against the carrier 10, and the limiting pieces 51 are pressed securely in the limiting groove 52. At this time, the top faces 211 of the filter segments 21 are flush with a top face of the small diameter portion 122 of the central boss 12.

When the motor 100 is actuated, through the rotary hub 120 and the rotary shaft 110, the carrier 10 and the color filter assembly 20 are rotated at a high speed so that light beams projected from a light source (not shown) can pass through the filter segments 21 so as to produce an image on a screen (not shown).

Figure 6:
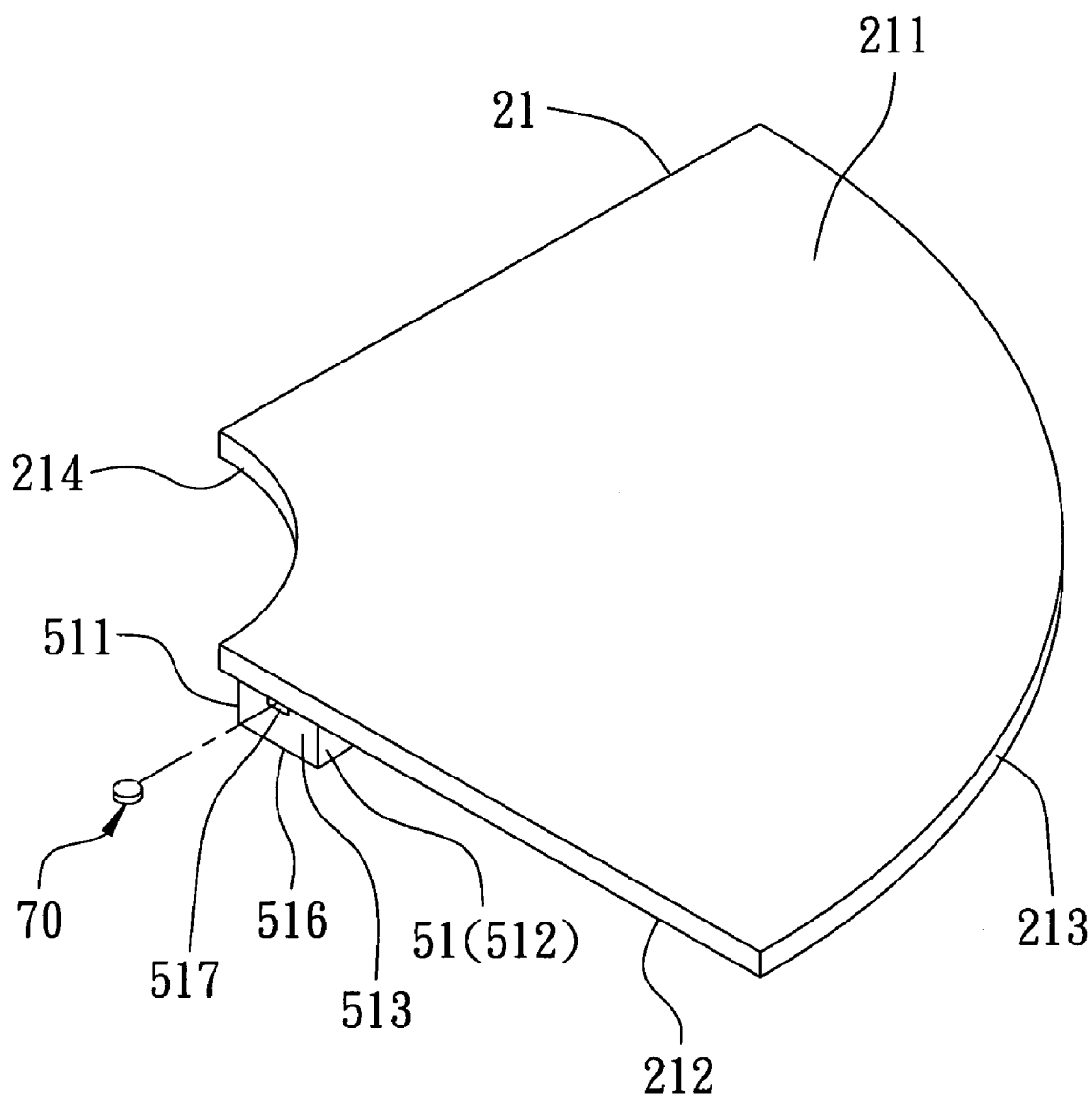
FIG. 6 is an enlarged perspective view of an assembly of a filter segment and a limiting piece of the preferred embodiment.
Figure 7:
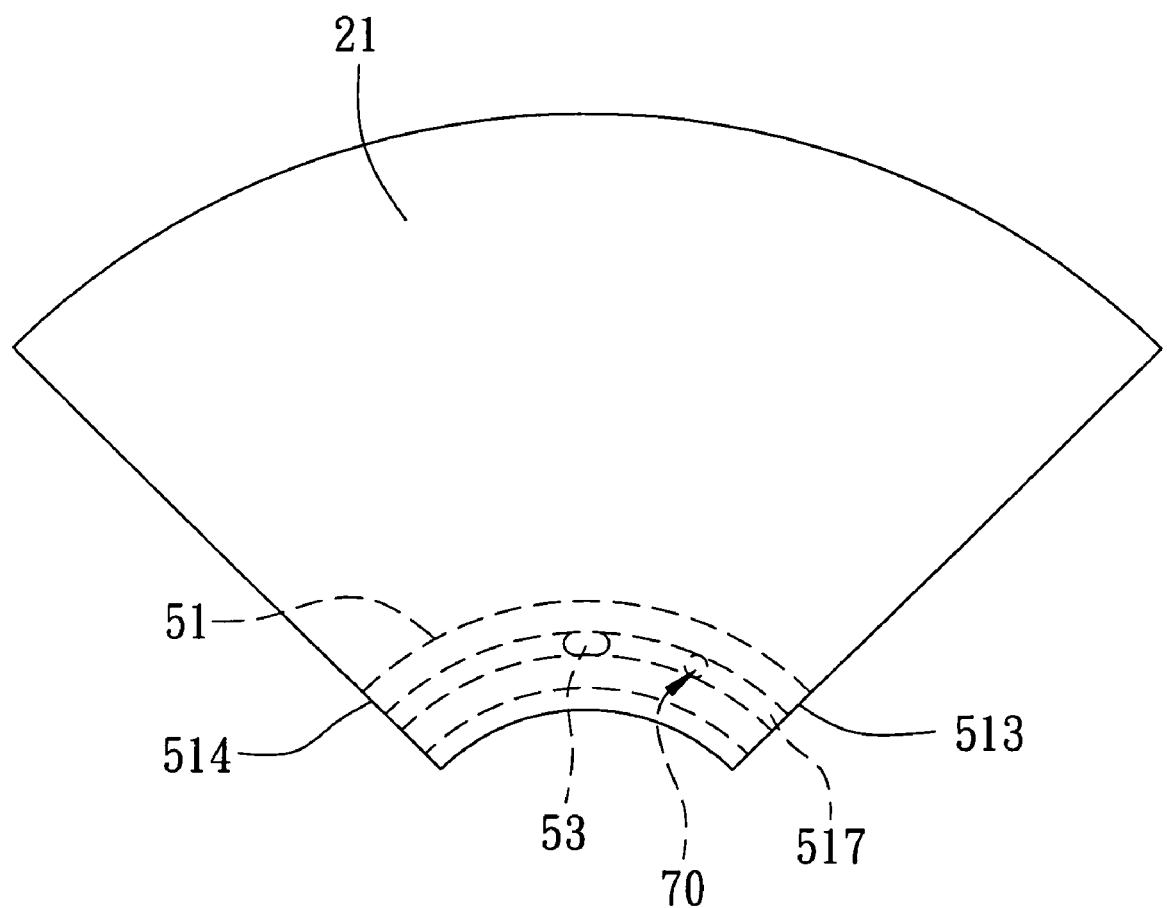
FIG. 7 is a schematic top view of FIG. 6.

With particular reference to FIGS. 6 and 7, to perform balancing of the color wheel assembly of the present invention, the bolts 60 are first loosened so as to permit removal of an assembly of one of the filter segments 21 and the corresponding limiting piece 51 from the carrier 10, after which the counterweight element 70 is inserted into the passage 517 starting from the first or second radial end face 513, 514 to an appropriate location. Thereafter, the assembly of the filter segment 21 and the corresponding limiting piece 51 is put back onto the carrier 10, and the bolts 60 are tightened. The counterweight element 70 may be formed using an adhesive material or clay.

From the aforementioned description, the advantages of the color wheel assembly of the present invention can be summarized as follows:

1. The adhering elements 53 are disposed in the passages 517 of the corresponding limiting pieces 51, and are limited to move therewithin, so that the adhering elements 53 are not likely to back up onto the bottom faces 212 of the filter segments 21 and interfere with light beams projected from a light source (not shown).

2. Balancing of the color wheel assembly of the present invention is easily performed. An assembly of one of the filter segments 21 and the corresponding limiting piece 51 is first removed from the carrier 10, after which the counterweight element 70 is inserted into the passage 517 of the removed assembly. Thus, it is not necessary to bore a balancing hole in the carrier 20 after assembly, as is done in the aforementioned conventional color wheel assembly, thereby eliminating problems caused by the boring process. Further, since the counterweight element 70 is disposed in the passage 517 of the assembly of one of the filter segments 21 and the corresponding limiting piece 51, it will not alter the overall structure of the assembly, and will not be removed due to centrifugal forces generated during rotation of the color wheel assembly.

3. When one of the filter segments 21 is damaged or defective, it can be removed by loosening the bolts 60. Since the present invention permits partial replacement of the components, the overall production costs of the present invention can be minimized.

It should be noted that the limiting pieces 51 of the present invention may also be formed integrally and respectively on the bottom faces 212 of the filter segments 21. Furthermore, the passage 517 in each limiting piece 51 may also be provided in the bottom face 516 of the corresponding limiting piece 51. In such a case, the limiting pieces 51 are adhered respectively on the top faces 211 of the filter segments 21 through the adhering elements 53, and the limiting groove 52 is provided in the bottom face of the press cover 30. The aforementioned advantages can be similarly achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A color wheel assembly comprising:
a carrier rotatable about an axis;
a color filter assembly mounted coaxially on said carrier and formed by a plurality of annularly arranged filter segments;
a press cover connected to said carrier to press said filter segments against said carrier; and
a connecting unit including a plurality of annularly arranged limiting pieces connected respectively to said filter segments, and a limiting groove provided in one of said carrier and said press cover for receiving said limiting pieces, each of said limiting pieces having opposite first and second radial end faces, an inner face interconnecting said first and second radial end faces, an outer face interconnecting said first and second radial end faces and extending outwardly of said inner face, and a passage extending between said inner and outer faces and extending through said first and second radial end faces.

2. The color wheel assembly of claim 1, wherein each of said filter segments has an inner peripheral face, an outer peripheral face extending around the inner peripheral face, and a top face and a bottom face extending between said inner and outer peripheral faces, said inner peripheral faces of said filter segments cooperatively defining a central hole in said color filter assembly.

3. The color wheel assembly of claim 2, wherein said limiting pieces further have top faces adjacent to said filter segments, and bottom faces adjacent to said carrier, said passages of said limiting pieces being formed respectively in said top faces of said limiting pieces, said connecting unit further including a plurality of adhering elements disposed respectively in said passages to connect said top faces of said limiting pieces to said bottom faces of said filter segments, respectively.

4. The color wheel assembly of claim 3, wherein said carrier has a top face, and said limiting groove is annular, and is formed in said top face of said carrier to receive said limiting pieces.

5. The color wheel assembly of claim 1, further comprising a plurality of fasteners for fastening said press cover to said carrier.

6. The color wheel assembly of claim 1, further comprising a packing ring clamped between said press cover and said color filter assembly.

7. The color wheel assembly of claim 1, further comprising a counterweight element disposed in said passage of one of said limiting pieces.

8. A color wheel assembly comprising:
a carrier rotatable about an axis and formed with an annular groove surrounding said axis;
a plurality of annularly arranged filter segments mounted coaxially on said carrier, said filter segments having inner peripheral faces proximate to said axis, and outer peripheral faces distal from said axis;
a plurality of annularly arranged limiting pieces connected respectively to said filter segments proximate to said inner peripheral faces, each of said limiting pieces having a top face connected to the respective one of said filter segments, and a passage formed in said top face; and
a press cover connected to said carrier to press said filter segments against said carrier.

9. The color wheel assembly of claim 8, further comprising a plurality of adhering elements for connecting said limiting pieces to said filter segments.

10. The color wheel assembly of claim 9, wherein said adhering elements are inserted respectively into said passages of said limiting pieces.

11. The color wheel assembly of claim 8, further comprising a plurality of fasteners, said inner peripheral faces of said filter segments cooperatively defining a central hole, said fasteners passing through said press cover and said central hole, and engaging said carrier so as to fasten said press cover to said carrier.

12. The color wheel assembly of claim 8, further comprising a packing ring clamped between said press cover and said filter segments.

13. The color wheel assembly of claim 8, wherein each of said limiting pieces further has a bottom face opposite to said top face, opposite first and second radial end faces interconnecting said top and bottom faces, an inner face interconnecting said first and second radial end faces and said top and bottom faces, and an outer face that interconnects said first and second radial end faces and said top and bottom faces and that extends outwardly of said inner face, said passage extending inwardly from said top face and through said first and second radial end faces.

14. The color wheel assembly of claim 8, further comprising a counterweight element disposed in said passage of one of said limiting pieces.

* * * * *